(12) United States Patent
Gas et al.

(10) Patent No.: US 12,379,134 B2
(45) Date of Patent: Aug. 5, 2025

(54) ELECTRICAL FLUID HEATER

(71) Applicant: VALEO SYSTEMES THERMIQUES, Le Mesnil-Saint-Denis (FR)

(72) Inventors: Pierre-Louis Gas, Prague (CZ); Ales Ruzicka, Prague (CZ); Serif Karaaslan, Le Mesnil-Saint-Denis (FR); Oscar Eduardo Alcocer, Toluca (MX)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 0 days.

(21) Appl. No.: 18/868,968

(22) PCT Filed: May 23, 2023

(86) PCT No.: PCT/EP2023/063746
§ 371 (c)(1),
(2) Date: Nov. 25, 2024

(87) PCT Pub. No.: WO2023/227579
PCT Pub. Date: Nov. 30, 2023

(65) Prior Publication Data
US 2025/0172319 A1    May 29, 2025

(30) Foreign Application Priority Data
May 25, 2022  (EP) .................... 22175479

(51) Int. Cl.
*F24H 1/12*      (2022.01)
*F24H 3/10*      (2022.01)
*F24H 9/1818*    (2022.01)
(52) U.S. Cl.
CPC ............ *F24H 1/121* (2013.01); *F24H 3/102* (2013.01); *F24H 9/1827* (2013.01); *F24H 2250/02* (2013.01)

(58) Field of Classification Search
None
See application file for complete search history.

(56) References Cited

U.S. PATENT DOCUMENTS 3,782,456 A * 1/1974 Gusmer ................ F28F 7/02
                                                165/83
4,255,646 A * 3/1981 Dragoy ................ F17C 7/04
                                                137/341
(Continued)

FOREIGN PATENT DOCUMENTS

DE    112015003124 T5    3/2017
EP        3945746 A1    2/2022

OTHER PUBLICATIONS

International Search Report in corresponding International Application No. PCT/EP2023/063746, dated Aug. 3, 2023 (3 pages).
(Continued)

*Primary Examiner* — Thor S Campbell
(74) *Attorney, Agent, or Firm* — Osha Bergman Watanabe & Burton LLP

(57) ABSTRACT

A fluid heater (100) includes at least one heating element (10) and at least one casing (20). The casing (20) includes a first and a second portion (20*a*) and (20*b*), a partition groove (22), an inlet and an outlet (24) and (26). The first and second portions (20*a*) and (20*b*) are assembled to define an enclosure receiving the heating element (10). The partition groove (22) divides casing (20) into a first chamber (20*d*) receiving fluid from the inlet (24) and defining a first pass "A" and a second chamber (20*e*) delivering fluid to the outlet (26) and defining a second, return pass "B". The casing (20) is formed with an intermediate connecting portion (28) to define an U-turn trajectory "C" forming fluid communication between the first and the second chambers (20*d*) and (20*e*) along plane of heating element (10) and extending in
(Continued)

longitudinal direction along lateral side of heating element (10).

13 Claims, 6 Drawing Sheets

(56) References Cited

U.S. PATENT DOCUMENTS

| | | | | |
|---|---|---|---|---|
| 4,334,141 A * | 6/1982 | Roller | ............... | A47J 31/545 |
| | | | | 219/505 |
| 4,343,988 A * | 8/1982 | Roller | ............... | A47J 31/545 |
| | | | | 392/467 |
| 5,256,857 A * | 10/1993 | Curhan | ............... | H05B 3/14 |
| | | | | 219/202 |
| 5,377,298 A * | 12/1994 | Yang | ............... | H05B 3/148 |
| | | | | 219/532 |
| 5,471,034 A * | 11/1995 | Kawate | ............... | H05B 3/141 |
| | | | | 219/505 |
| 6,124,570 A * | 9/2000 | Ebner | ............... | F24H 1/009 |
| | | | | 219/202 |
| 6,178,292 B1 * | 1/2001 | Fukuoka | ............... | F28F 9/002 |
| | | | | 165/181 |
| 6,957,013 B2 * | 10/2005 | Zimmer | ............... | B01D 1/0017 |
| | | | | 392/397 |
| 7,977,606 B2 * | 7/2011 | Adachi | ............... | H05B 3/50 |
| | | | | 219/202 |
| 8,170,406 B2 * | 5/2012 | Wu | ............... | F24H 9/1827 |
| | | | | 392/467 |
| 8,917,981 B2 * | 12/2014 | Trebouet | ............... | B60S 1/487 |
| | | | | 392/502 |
| 8,948,582 B2 * | 2/2015 | Kominami | ............... | F24H 9/146 |
| | | | | 392/377 |
| 9,664,412 B2 * | 5/2017 | Sakai | ............... | H05B 3/24 |
| 9,676,251 B2 * | 6/2017 | Yokoyama | ............... | F24H 9/0015 |
| 2015/0168014 A1 * | 6/2015 | Wu | ............... | H05B 3/141 |
| | | | | 219/202 |
| 2016/0069588 A1 | 3/2016 | Kominami et al. | | |
| 2017/0145559 A1 * | 5/2017 | Shin | ............... | C23C 14/5806 |

OTHER PUBLICATIONS

Written Opinion in corresponding International Application No. PCT/EP2023/063746, dated Aug. 3, 2023 (5 pages).

* cited by examiner

ELECTRICAL FLUID HEATER

FIELD OF THE INVENTION

The present invention relates to a heat exchanger, particularly to an electrical fluid heater for a vehicle.

BACKGROUND OF THE INVENTION

A vehicle generally includes a heater for heating air to be supplied to a passenger compartment. Alternatively, the heater is used to supply heated air to demist or defrost the windscreen. In some cases, the heater is used to supply hot air or hot coolant for cold starting the engine. With the emergence of the electric vehicles and hybrid vehicles, the heater is also applicable for battery thermal management. The heaters can be used for efficient thermal management of the batteries used for powering the electric motor, thereby drastically enhancing the service life of the batteries. The air to be heated is generally passed through a heat exchanger, which includes a heating element such as for example, heat exchange flow pipes through which a heated fluid circulates in case of thermal heater or an electrical resistive element supplied with current in case of an electrical resistive heater. Particularly, the air to be heated circulates across the heating element of the heat exchanger and extracts heat from the heating element.

The conventional electrical heater 1 illustrated in FIG. 1 includes a plurality of heating elements 2 arranged with respect to fluid heating spaces configured with respect to the heating elements 2 for heat exchange between the heating elements 2 and the fluid flowing in the heating spaces around the heating elements 2. Each heating element 2 includes a tube that in turn receives an electrical core therein. Specifically, the tube together with the electrical core forms the heating element. The electrical core for example comprises PTC (Positive Temperature Coefficient) resistors. Each tube may have several electrical cores, which may be arranged one after the other in a direction of the tube. Each heating element includes electrodes on at least one side of the at least one electrical core for power supply through the heating element. The electrodes and electrical cores are comprised in heat generation portions of the heating elements. Further, the heating elements include electrically insulating and thermally conductive material layers. The layers being located in annular space between one of the electrodes and walls of the tube. In this way, the tube is electrically insulated from the electrodes and the electrical core but thermally in contact with them.

In case of the conventional electrical fluid heater 1, the fluid heating spaces are either defined by a housing enclosing the heating elements 2 or by a plurality of modular elements, particularly, plates 4 that are assembled to define the fluid heating spaces with respect to the heating elements 2. The plates 4 are stacked one above the other between end plates 5a and 5b, wherein aligned portions 4a and 4b of the plates 4 define respective fluid flow passes that are connected by an intermediate manifold defined between the end plate 5b and the last plate of the plurality of plates 4. Such first and second flow passes connected by intermediate manifold define U flow trajectory of the fluid within the electrical fluid heater 1. Further, such configuration enables disposing inlet 6a and outlet 6b on top of the electrical fluid heater 1, thereby rendering compact configuration to the electrical heating element 1. The fluid heating spaces are in fluid communication with an inlet 6a and an outlet 6b. Particularly, the fluid entering the electrical heater 1 through the inlet 6a flows through the fluid heating spaces adjacent to a first portion of the heating elements 2 to define the first pass and in the process extracts heat from the first portion of the heating elements 2. The fluid after extracting heat by flowing through the first pass is directed to flow through the second pass to further extract heat from the second portions of the heating elements. The fluid after extracting heat from the heating elements 2 egresses through the outlet 6b. As the heating elements are stacked one above the other, the electric fluid heater of such configuration is bulky and faces packaging issues. Further, the fluid flowing through the fluid heating spaces so configured is not uniformly distributed and fail to sufficiently and directly contact the heating elements. Furthermore, air bubbles could potentially be formed at the edges of the heating elements that detrimentally impact the efficiency and performance of the electric heater. Indeed, air is acting as a thermal isolator and hot spots on the heating elements could potentially arise. In case the fluid heating spaces are defined by joining a plurality of plates, the brazing of the plates is an issue. More specifically, such configuration requires brazing at multiple sites that in turn require high brazing tolerances and difficulty in manufacturability. Further, in case of the conventional electrical fluid heater, the pressure drop of fluid flowing through the heat exchanger is unnecessarily increased due to inlet/outlet coolant flow being perpendicular to the heating elements and constant zig-zag coolant flow through adjacent plate holes and between the heating elements, thereby detrimentally impacting the efficiency and performance of the electric fluid heater.

Accordingly, there is a need for an electrical fluid heater that is having a flat compact configuration and addresses the packaging issues. Further, there is a need for an electric fluid heater that improves distribution of the heat exchange fluid along the surface of the heater element even when the heater element is of substantially large size. Further, there is a need for an electric heater configured with fluid heating spaces that maximizes heat exchange between the heater element and the fluid flowing through the fluid heating spaces, thereby improving efficiency and performance of the electric heater. Still further, there is a need for an electric heater that ensures convenient brazing connection between the plates configuring the fluid heating spaces with respect to the heating element by homogenizing the brazing temperature and avoiding thermal stresses.

An object of the present invention is to provide an electrical fluid heater that obviates the problems faced by conventional electrical fluid heaters due to non-uniform fluid distribution with respect to the heating elements irrespective of the size of the heating element.

Another object of the present invention is to provide an electrical fluid heater that is compact in configuration and addresses the packaging issues faced by conventional electrical fluid heaters.

Still another object of the present invention is to provide an electrical fluid heater that ensures homogeneous fluid distribution and fluid filling in all the fluid flow passes to achieve improved efficiency and performance.

Yet another object of the present invention is to provide an electrical fluid heater that prevents formation of air bubbles within the electrical fluid heater.

Further object of the present invention is to provide an electrical fluid heater formed with features for scavenging fluid from critical portions.

Still another object of the present invention is to provide an electrical fluid heater that require fewer brazing sites for manufacturing thereof, thereby reducing the problems such as higher brazing tolerances, manufacturing difficulties and thermal stresses due to more number of brazing sites required for manufacturing the conventional electrical fluid heaters.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

SUMMARY OF THE INVENTION

An electrical fluid heater is disclosed in accordance with an embodiment of the present invention. The electrical fluid heater includes at least one heating element and at least one casing. The casing includes a first portion, a second portion, a partition groove, an inlet and an outlet. The second portion is assembled to the first portion along an interface plane to define an enclosure for receiving the heating element therein. The partition groove formed on the casing extends between a proximal end and a distal end of the casing to divide the casing into first chamber for a first pass "A" and a second chamber for a second, return pass "B" for fluid flow. The inlet supplies fluid to the first pass "A" and the outlet collects fluid from the second pass after heat exchange with the heating element. The casing formed with an intermediate connecting portion to define an U-turn trajectory "C" forming fluid communication between the first chamber and the second chamber along the plane of the heating element and extending in longitudinal direction along lateral side of the heating element.

In accordance to one embodiment of the present invention, the electrical fluid heater includes a pair of the casings stacked in overlapping manner with respect to one another, with each casing receiving at least one heating element. The inlet and the outlet are disposed at the proximal end of the first casing. The intermediate connecting portion is disposed at proximal end of the second casing. The first chambers of adjacent first casings are in fluid communication with each other via first set aligned slots at distal ends thereof. The first and second chambers of the second casing are in fluid communication with each other via the intermediate connecting portion. The second chambers of adjacent first casings are in fluid communication with each other via second set of aligned slots at distal ends thereof.

Preferably, at least one of the first portion and the second portion of the casing is of flat construction.

Further, the first portion and the second portion of the casing are identical and symmetrical with respect to each other about the interface plane.

Particularly, at least a portion of the heating element is disposed in the first chamber, whereas the remaining portion of the heating element is disposed in the second chamber of the casing.

Further, the partition groove is centrally disposed with respect to the casing and separates the first pass "A" from the second pass "B".

Particularly, the inlet and the outlet are formed by assembling complementary profiles formed on the first portion and the second portion of the casing respectively that are received and held in sleeves.

Preferably, the inlet and the outlet are centrally disposed with respect to the respective the first and the second chambers.

Further, the connecting portion is having a cross section that varies along longitudinal direction of the heating element Particularly, the intermediate connecting portion is formed by assembling sections at either one of distal and proximal ends of the first portion and the second portion of the casing.

In accordance with one embodiment, the intermediate connecting portion is formed by assembling the sections at the distal ends of the first portion and the second portion of the casing opposite to the inlet and the outlet of the casing.

In accordance with another embodiment the intermediate connecting portion is formed by assembling the sections at the proximal ends of the first portion and the second portion of the second casing and is disposed on same side on which the inlet and the outlet are disposed on the first casing.

Particularly, the intermediate connecting portion is having largest cross-section at the center and the cross section gradually decreases from the center to the respective lateral sides of the casing.

Further, the inlet and the outlet are orthogonally disposed with respect to lateral sides of the heating element received in the casing and at center of the first and second chambers respectively.

Also, turbulators are disposed in annular space between the heating element and the casing.

Furthermore, the casing includes an intermediate groove having a cross section with curved profile. The intermediate groove extends along lateral side of the heating element and is disposed between the heating elements received in the casing.

The heating element includes a tubular element, at least one core formed with electrodes on at least one side thereof and electrically insulating and thermally conductive material layers. The lateral sides of the tubular element is having a curved profile. The core is received inside the tubular element while the corresponding electrodes extend out from both sides of the tubular element for enabling power supply through the heating element. The electrically insulating and thermally conductive material layers is disposed in annular space between the electrode and walls of the tubular element.

Generally, the radius of curvature "R" of the cross section of the curved profile of the intermediate groove being more that the radius of curvature "r" of the curved profile of the lateral sides of the tubular element.

BRIEF DESCRIPTION

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein.

The present invention envisages an electrical fluid heater, particularly, a high temperature coolant heater, hereinafter, simply referred to as a fluid heater. The fluid heater includes at least one heating element and at least one casing. The casing includes a first portion, a second portion, a partition groove, an inlet and an outlet. The second portion is assembled to the first portion along an interface plane to define an enclosure for receiving the heating element therein. The partition groove formed on the casing extends between a proximal end and a distal end of the casing to divide the casing into first chamber for a first pass "A" and a second chamber for a second, return pass "B" for fluid flow. The inlet supplies fluid to the first pass "A" and the outlet collects fluid from the second pass after heat exchange with the heating element received in the casing. The casing formed with an intermediate connecting portion to define an U-turn trajectory "C" forming fluid communication between the first chamber and the second chamber along the plane of the heating element and extending in longitudinal direction along lateral side of the heating element. Although, the present invention is explained in the forthcoming description and the accompanying drawings, with the example of high temperature coolant heater, however, the present invention is applicable for any other heat exchanger, for use in vehicular or non-vehicular applications, where the electrical heater is required to be compact in configuration to address packaging issues, while still ensuring improved fluid distribution within the electrical heater to permit efficient heat exchange thereby achieving improved efficiency and performance of the electrical heater.

Figure 1:
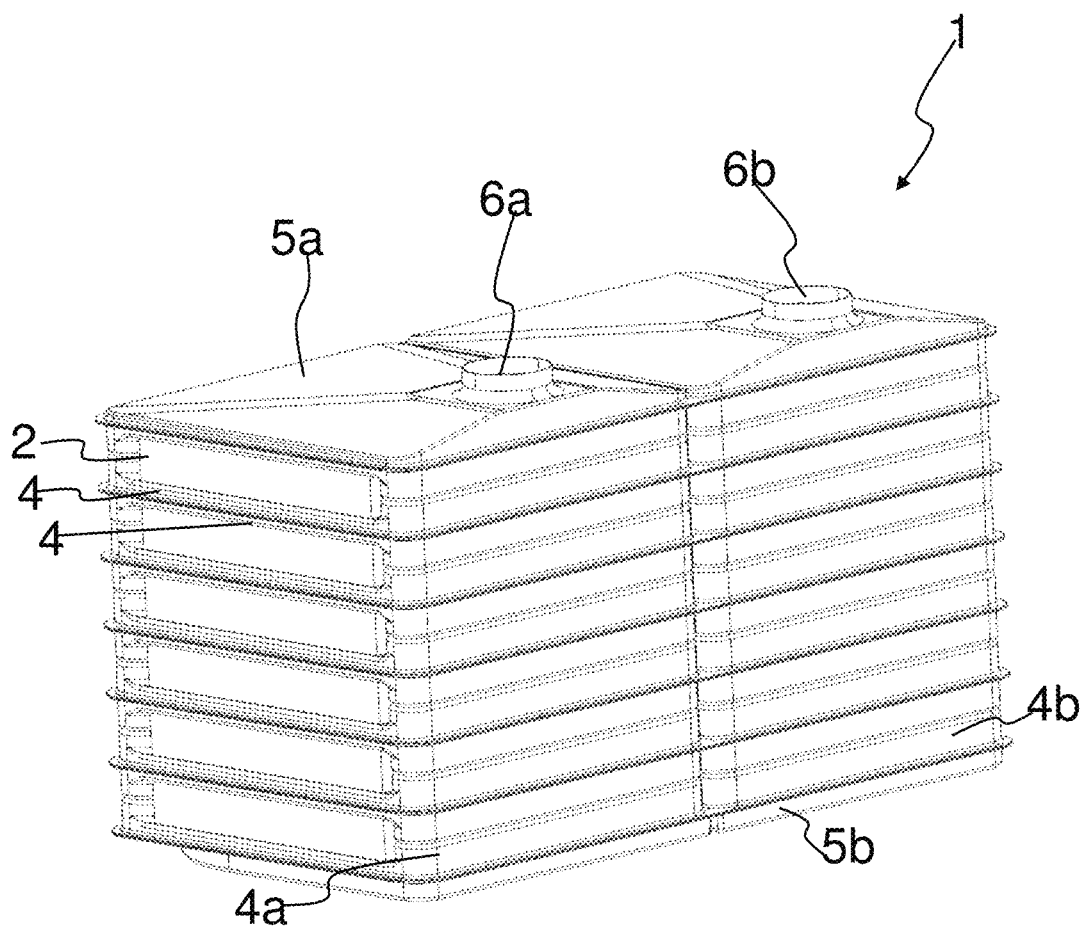
FIG. 1 illustrates an isometric view of a conventional electrical fluid heater.
Figure 2:
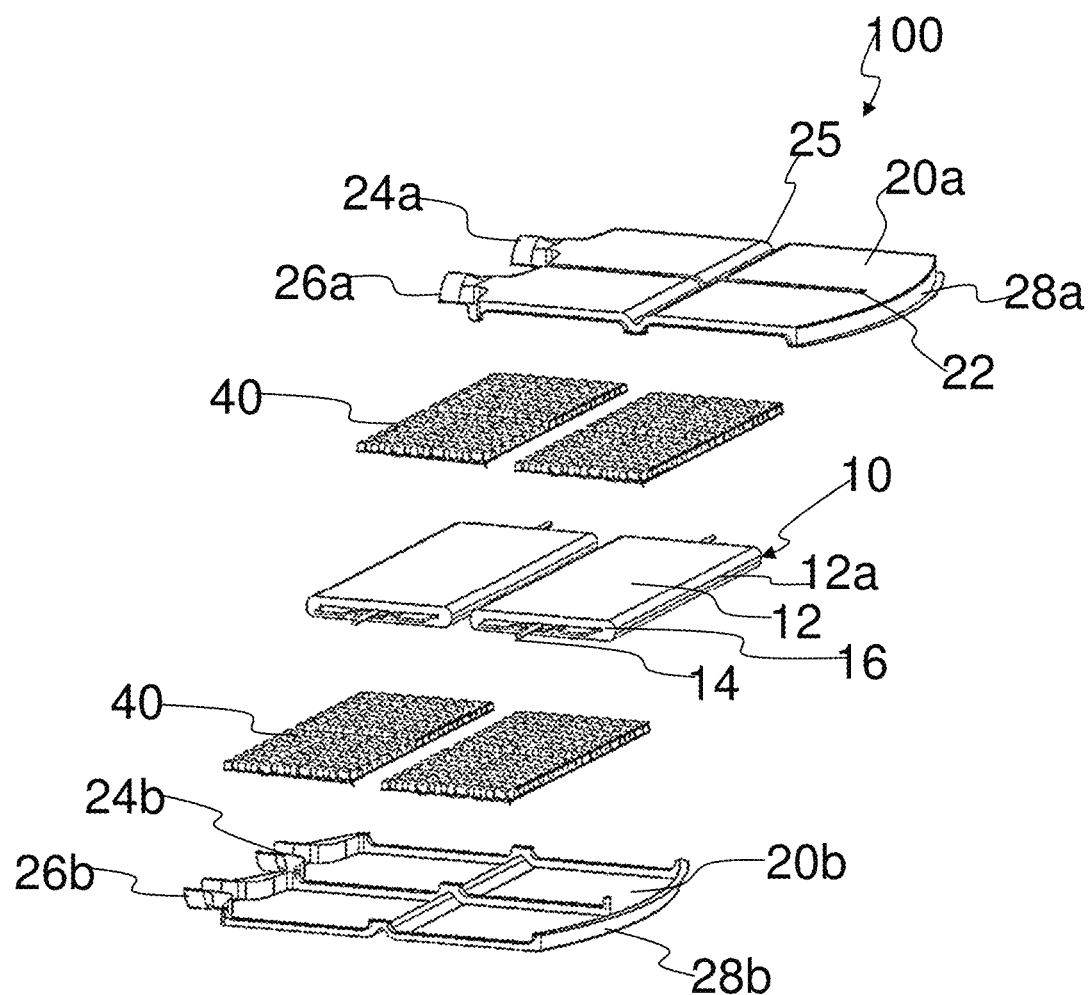
FIG. 2 illustrates an exploded view of an electrical fluid heater in accordance with an embodiment of the present invention.
Figure 3:
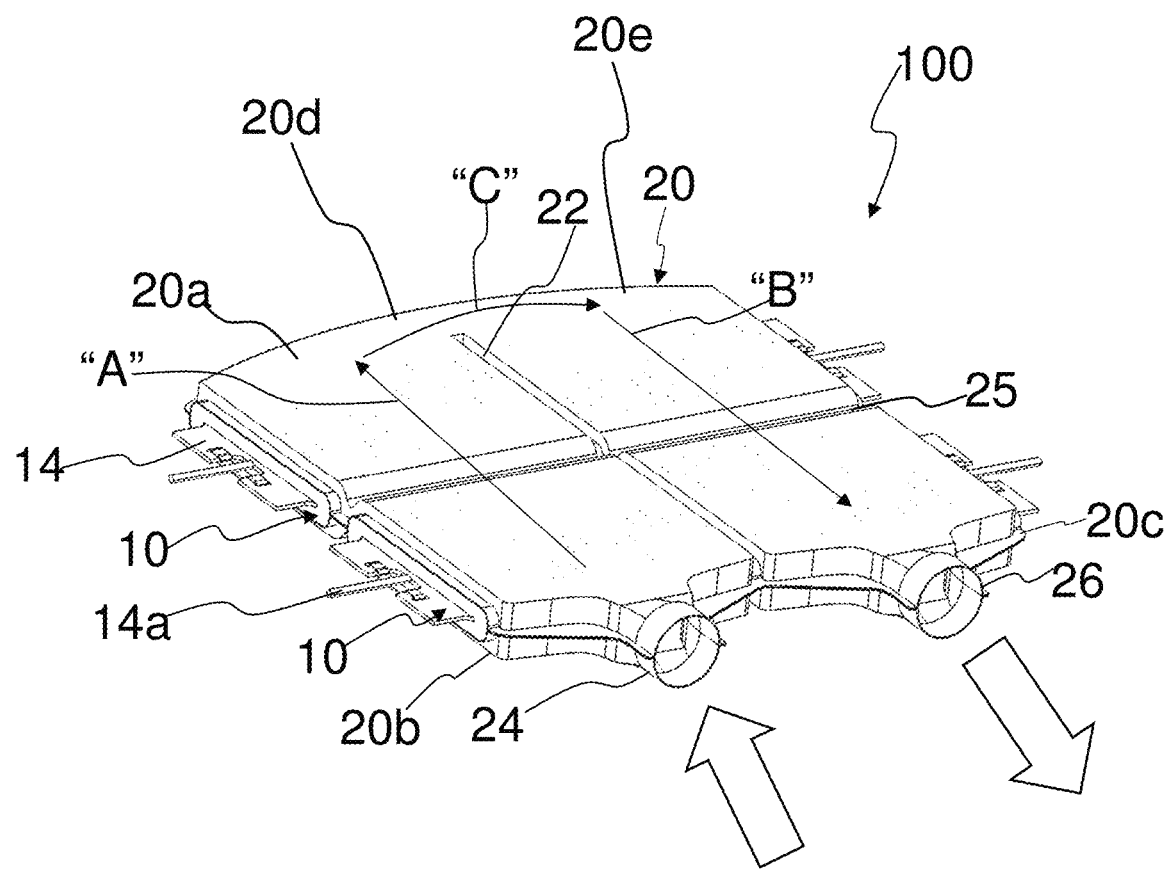
FIG. 3 illustrates an assembled view of the electrical fluid heater of FIG. 2.

FIG. 2 illustrates an exploded view of an electrical fluid heater 100, hereinafter, referred to as a fluid heater 100, in accordance with an embodiment of the present invention. FIG. 3 illustrates an assembled view of the electrical fluid heater 100. In accordance with an embodiment, the electrical fluid heater is a high voltage coolant heater and the electrical fluid heater of the present invention is explained in the forthcoming description and drawings with the example of the high voltage coolant heater. The electrical fluid heater 100 includes at least one heating element 10 and at least one casing 20.

The casing 20 includes a first portion 20a, a second portion 20b, a partition groove 22, an inlet 24 and an outlet 26. Generally, at least one of the first portion 20a and the second portion 20b of the casing 20 is of flat construction. Preferably, the first portion 20a and the second portion 20b of the casing 20 is of flat construction. Such a configuration of the casing 20 renders the electric fluid heater compact. Further, the first portion 20a and the second portion 20b of the casing 20 are identical and symmetrical with respect to each other about an interface plane 20c. Such configuration renders the assembling process convenient by eliminating the problems due to mismatching parts that are required to be selected before assembly. Further, such configuration of the casing 20 renders the manufacturing process economical by eliminating need for separate dies or blanks for manufacturing non-identical portions. The second portion 20b of the casing 20 is assembled to the first portion 20a along the interface plane 20c to define an enclosure for receiving the heating element 10 therein. The partition groove 22 formed on the casing 20 extends between a proximal end and a distal end of the casing 20 to divide the casing 20 into a first chamber 20d for a first pass "A" and a second chamber 20e for a second, return pass "B" for fluid flow. Preferably, the partition groove 22 is centrally disposed with respect to the casing 20 and separates the first pass "A" from the second pass "B". Particularly, at least a portion 10a of the heating element 10 is disposed in the first chamber 20d, whereas the remaining portion 10b of the heating element 10 is disposed in the second chamber 20e of the casing 20. The inlet 24 supplies fluid to the first pass "A" to cause heat exchange between fluid and the portion of the heating element 10a received in the first chamber 20d and the outlet 26 collects fluid from the second pass after the fluid had underwent heat exchange with the heating element 10. However, the present invention is not limited to any particular configuration of the partition groove 22 and position thereof on the casing 20 as far as the partition groove 22 divides the interior of the casing into the first chamber 20d and the second chamber 20e that are in fluid communication with each other via the intermediate connecting portion 25. Further, the present invention is not limited to position of the heating element 10 inside the casing 10, proportion of the heating element 10 in the first chamber 20d and the second chamber 20e. Preferably, the heating element 10 is so positioned inside the casing 20 such that at least a portion of each of opposite electrodes 14a emanating from core 14 of the heating element 10 is extending out of the casing 20.

The inlet 24 and the outlet 26 are formed by assembling complementary profiles 24a, 26a and 24b, 26b formed on the first portion 20a and the second portion 20b of the casing 20 respectively that are received and held in sleeves 30a and 30b. More specifically, the complimentary profiles 24a and 24b formed on the first and the second portions 20a and 20b of the casing 20 respectively are assembled to each other and the assembly is received and held in the sleeve 30a. Similarly, the complimentary profiles 26a and 26b formed on the first and the second portions 20a and 20b of the casing 20 respectively are assembled to each other and the assembly is received and held in the sleeve 30b. Generally, the inlet 24 and the outlet 26 are centrally disposed with respect to the respective the first and the second chambers 20d and 20e. Such configuration enables uniform distribution of the fluid in the first chamber 20d and improved collection of the fluid from the second chamber 20e. Further, the inlet 24 and the out 26 are disposed along the plane of the heating elements 10. Accordingly, such configuration of the inlet and outlet 24 and 26 renders the electrical fluid heater 100 compact compared to conventional electrical fluid heaters, thereby addressing the packaging issues faced by the conventional electrical fluid heaters. However, the present invention is not limited to any particular position of the inlet 24 and the outlet 26 with respect to the first chamber 20d and the second chamber 20e respectively, as far as the position of the inlet assists in uniform distribution of the fluid to the first chamber 20d, whereas position of the outlet assists in improved collection of the fluid from the second chamber 20e.

The casing 20 formed with an intermediate connecting portion 28 to define an U-turn trajectory "C" forming fluid communication between the first chamber 20d and the second chamber 20e along the plane of the heating element 10 and extending in longitudinal direction along lateral side of the heating element 10. The intermediate connecting portion 28 is having cross section that varies along longitudinal direction of the heating element 10. Particularly, the intermediate connecting portion 28 is having largest cross-section at the center and gradually decreases from the center to the respective lateral sides of the casing 20. The cross section of the intermediate connecting portion is varying along the length thereof to increase local coolant velocity, thereby improving coolant distribution across the heating element and scavenging potential air bubbles. Such configuration of the intermediate connecting portion 28 configuring the U-turn provides several advantages, for example, such configuration of the intermediate connecting portion 28 improves coolant distribution, thereby scavenging potential air bubbles and evenly distributing the coolant along the width of the heating element without needing any deflectors. Further, the IGBT's/power pack can be preferably located in the area proximal to the intermediate connecting portion 28 due to high coolant flow velocity and absence of heat transferring turbulators in this section of the intermediate connecting portion 28. The center of the intermediate connecting portion is aligned to the partition groove 22. The inlet 24 and the outlet 26 are orthogonally disposed with respect to lateral sides 12a of tubular elements 12 of the heating element 10 received in the casing 20. Further, the inlet 24 and the outlet 26 are disposed at center of the first and second chambers 20d and 20e respectively. Such configuration of the intermediate connecting portion 25 and the position of the inlet 24 and the outlet 26 improves fluid communication between the first chamber and the second chamber 20d and 20e.

Figure 5:
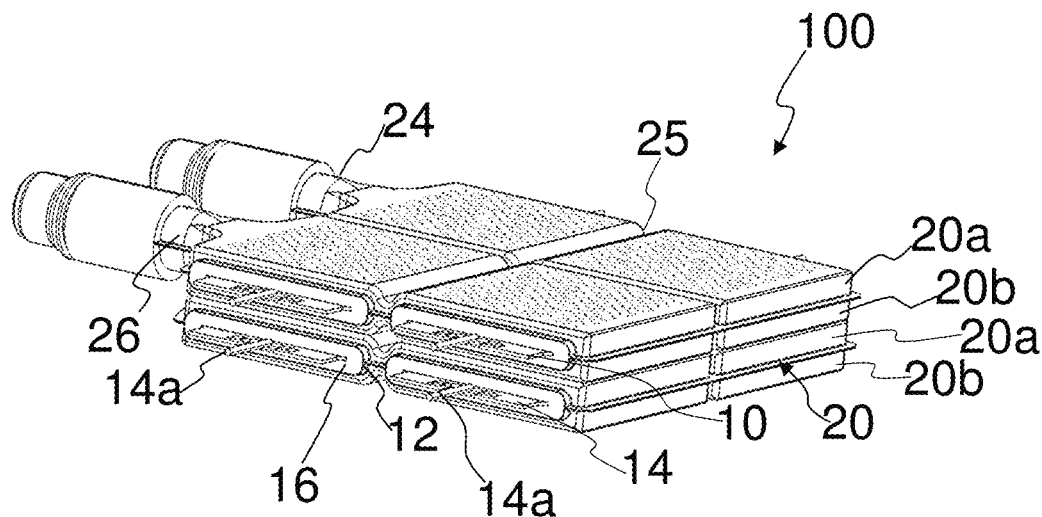
FIG. 5 illustrates an Isometric view of the electrical fluid heater of FIG. 4.
Figure 6:
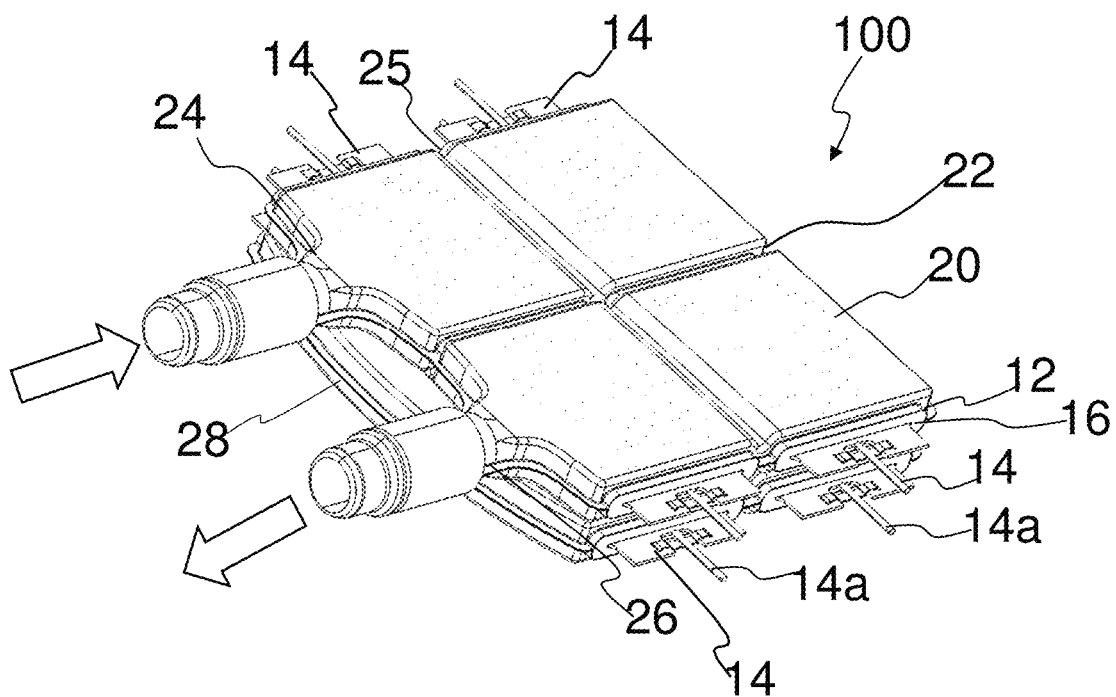
FIG. 6 illustrates another isometric view of the electrical fluid heater of FIG. 4.

The intermediate connecting portion 28 is either disposed opposite to the inlet and outlet 24 and 26 formed on the same casing as illustrated in FIG. 3 or the intermediate connecting portion 28 is disposed on one casing and along the inlet and outlet 24 and 26 of another casing as illustrated in FIG. 5 and FIG. 6.

Figure 4:
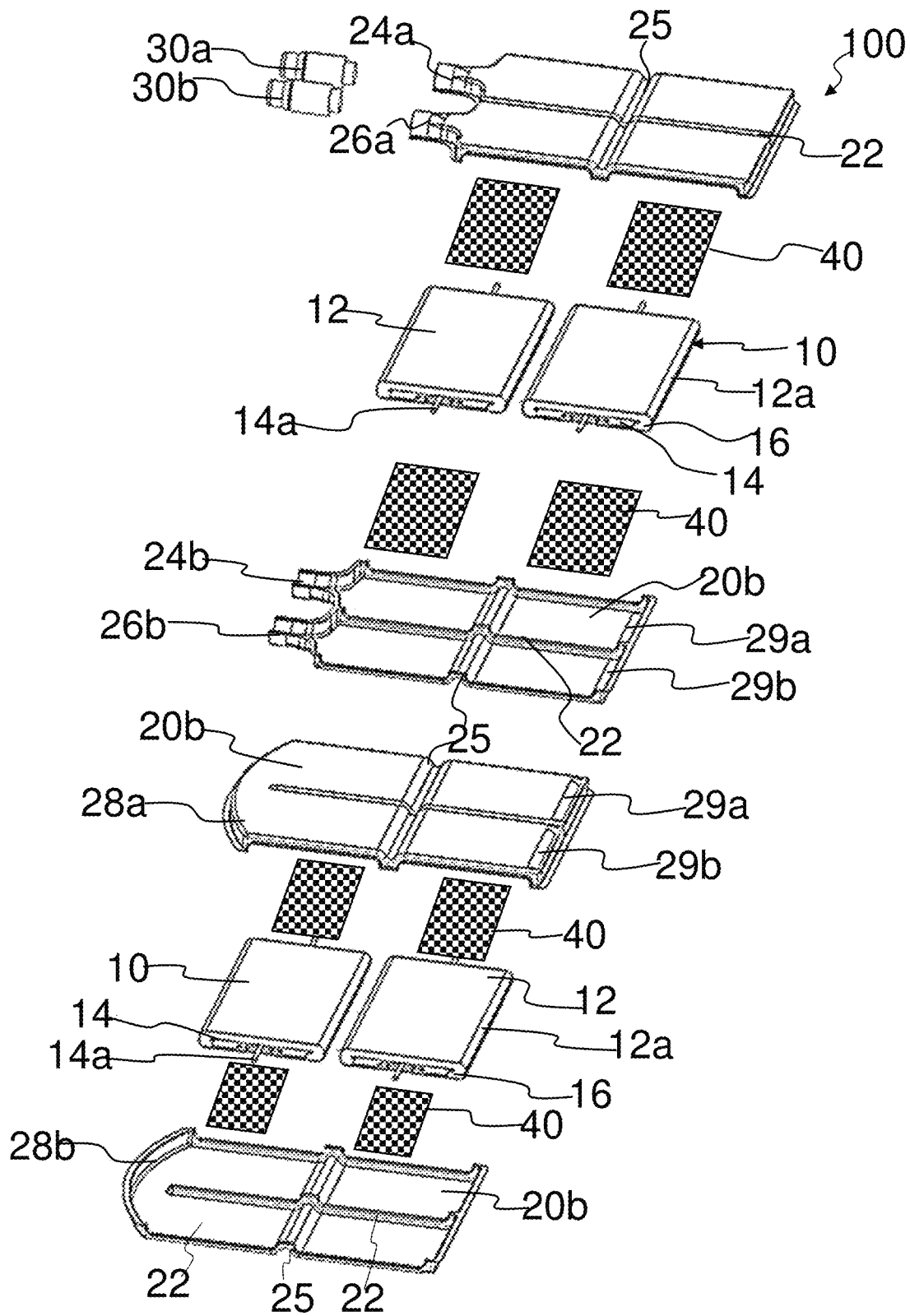
FIG. 4 illustrates an exploded view of an electrical fluid heater in accordance with another embodiment of the present invention, wherein the electric fluid heater includes a pair of casings stacked one above the other with each casing receiving at least one heating element.

More specifically, the electrical fluid heater 100 in accordance with another embodiment as illustrated in FIG. 4-FIG. 6 includes pair of the casings 20 stacked in overlapping manner with respect to one another, with each casing 20 receiving at least one heating element 10. The inlet and the outlet 24 and 26 are disposed at the proximal end of the first casing 20 and the intermediate connecting portion 28 is disposed at proximal end of the second casing 20. More specifically, the intermediate connecting portion 28 formed on the second casing 20 and the inlet and the outlet 24 and 26 formed on the first casing are disposed on the same side of the electrical fluid heater 100. The first casing being disposed above the second casing, gravity assists the flow of the fluid from the first casing to the second casing. More specifically the first chambers 20d of the adjacent first and second casings 20 being in fluid communication with each other via first set aligned slots 29a at distal ends thereof illustrated in FIG. 4. Further, the first and second chambers 20d and 20e of the second casing being in fluid communication with each other via the intermediate connecting portion 28. Furthermore, the second chambers 20e of adjacent first and second casings 20 being in fluid communication with each other via second set of aligned slots 29b at distal ends thereof again illustrated in FIG. 4. Such configuration configures fluid communication between the inlet 24 and the outlet 26 via the first chambers 20d of the first casings, the intermediate connecting portion 28 and the second chambers 20e of the first and second casings.

The intermediate connecting portion 28 is formed by assembling sections 28a and 28b at either one of distal and proximal ends of the first portion 20a and the second portion 20b of the casing 20. In accordance with an embodiment of the present invention as illustrated in FIG. 2 and FIG. 3, the intermediate connecting portion 28 is formed by assembling the sections 28a and 28b at the distal ends of the first portion 20a and the second portion 20b of the casing 20 opposite to the inlet and the outlet 24 and 26 of the casing 20. In accordance with another embodiment of the present invention as illustrated in FIG. 4 and FIG. 6, the intermediate connecting portion 28 is formed by assembling the sections 28a and 28b at the proximal ends of the first portion 20a and the second portion 20b of the second casing 20 and is disposed on same side on which the inlet and the outlet 24 and 26 are disposed on the first casing 20. However, the present invention is not limited to any particular shape and configuration of the intermediate connecting portion 28 or whether the intermediate connecting portion 28 is formed on distal end of the casing 20 opposite to the inlet and outlet 24 and 26 or at proximal end of the second casing and on same side of the inlet and outlet 24 and 26 as far as the intermediate connecting portion 28 is capable of uniformly distributing the fluid along the entire lateral sides of the casing 20 along which the intermediate connecting portion 28 is formed to achieve uniform distribution of the fluid to the heating elements 10.

Figure 7:
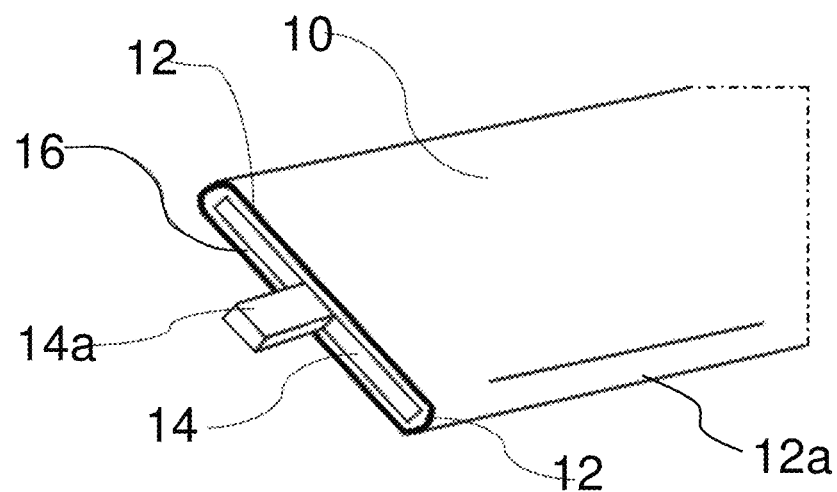
FIG. 7 illustrates a schematic representation of a heating element of the electrical fluid heater of FIG. 2 and FIG. 4.

Referring to the FIG. 7, the heating element 10 of the electrical fluid heater 100 includes the tubular element 12, at least one core 14 and electrically insulating and thermally conductive material layers 16. The lateral sides 12a of the tubular element 12 is having a curved profile. The core 14 for example comprises PTC (Positive Temperature Coefficient) resistors and is formed with the electrodes 14a on at least one of the opposite sides thereof. The electrodes can be formed on the same side of the core 14 to address packaging issues. The core 14 is received inside the tubular element 12 while the electrodes 14a emanating from the core 14 extend out from both sides of the tubular element 12 to be connected to a power source for enabling power supply through the heating element 10. The electrically insulating and thermally conductive material layers 16 is disposed in annular space between the core 14 and walls of the tubular element 12. With such configuration of the heating element 10, the tubular element 12 is electrically insulated with respect to the core 14 but is thermally in contact with the core 14. With such configuration the fluid around the heating element 10 is heated by the heating element 10 but the transmission of electric current to the fluid is avoided.

Figure 8:
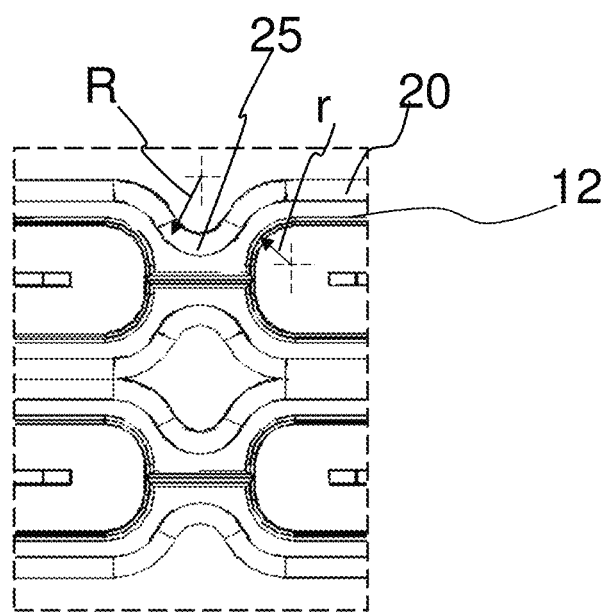
FIG. 8 illustrates an enlarged view depicting an enlarged view depicting the intermediate groove disposed between the heating element.

The electrical fluid heater 100 further includes turbulators 40 disposed in annular space between the heating element 10 and the casing 20 to further enhance the contact and contact time between the fluid entering the casing 20 and the heating elements 10 to improve efficiency and performance of the electrical fluid heater 100. The electrical fluid heater 100 of the present invention includes further features to improve contact and improve contact time between the fluid received in the casing 20 and the heating elements 10. For example, the casing 20 includes an intermediate groove 25 having a cross section with curved profile. The intermediate groove 25 extends orthogonal to the inlet 24 and the outlet 26. The portions between the heating elements 10 as illustrated in FIG. 8 are prone to hot spots due to absence of the turbulators. The radius of curvature "R" of the cross section of the curved profile of the intermediate groove 25 being more that the radius of curvature "r" of the curved profile of the lateral sides of the tubular element 12. Such configuration of the intermediate groove 25 increase the heat transfer to the coolant, especially on the heating element side walls opposing the coolant flow. Further, such configuration assists in scavenging the fluid/coolant between the heating elements 10 and avoids 'hot spots' in the heating element tube side walls. Furthermore, such configuration addressed the pressure drop issues and the fluid is uniformly distributed throughout the length of the heating element 10. More specifically, the intermediate groove 25 causes the fluid to reach the entire surface of the heating element 10 even if the heating element is larger in dimension. The intermediate groove 25 extends along lateral side of the heating element 10 and is disposed between the heating elements 10 received in the casing 20. However, the present invention is not limited to any particular configuration, number and placement of the intermediate groove 25 as long as the intermediate groove addresses the pressure drop issues and assist is uniform distribution of the fluid over entire surface of the heating element 10.

Obviously, numerous modifications and variations of the present invention are possible in light of the above teachings. It is therefore to be understood that the invention may be practiced otherwise than as specifically described herein.

In any case, the invention cannot and should not be limited to the embodiments specifically described in this document, as other embodiments might exist. The invention shall spread to any equivalent means and any technically operating combination of means.

The invention claimed is:

1. An electrical fluid heater comprising:
   at least one heating element comprising:
      a tubular element, wherein lateral sides of the tubular element have curved profile;
      at least one core received inside the tubular element and formed with electrodes on at least one side of the core that extend out from both sides of the tubular element for enabling power supply through the heating element;
      electrically insulating and thermally conductive material layers disposed in an annular space between the electrodes and walls of the tubular element;
   at least one casing comprising:
      a first portion; and
      a second portion assembled to the first portion along an interface plane to define an enclosure for receiving the heating element therein;
      a partition groove formed thereon extending between a proximal end and a distal end of the casing to divide the casing into a first chamber for a first pass "A" and a second chamber for a second, return pass "B" for fluid flow;
      an inlet and an outlet, wherein the inlet supplies fluid to the first pass "A" and the outlet collects fluid from the second pass "B" after heat exchange with the heating element,
   wherein the casing is formed with an intermediate connecting portion adapted to define a U-turn trajectory "C" forming fluid communication between the first chamber and the second chamber along a plane of the heating element and extending in longitudinal direction along one of the lateral sides, and
   wherein at least a portion of the heating element is disposed in the first chamber of the casing, and a remaining portion of the heating element is disposed in the second chamber of the casing.

2. The electrical fluid heater as claimed claim 1, comprising:
   a pair of the casings stacked in overlapping manner with respect to one another, with each casing receiving at least one heating element,
   the inlet and the outlet and disposed at the proximal end of the first casing and the intermediate connecting portion disposed at the proximal end of the second casing,
   the first chambers of adjacent first casings being in fluid communication with each other via first set aligned slots at distal ends thereof,
   the first and second chambers and of the second casing being in fluid communication with each other via the intermediate connecting portion,
   the second chambers of adjacent first casings being in fluid communication with each other via second set of aligned slots at distal ends thereof.

3. The electrical fluid heater as claimed in claim 1, wherein at least one of the first portion and the second portion of the casing is of flat construction.

4. The electrical fluid heater as claimed in claim 1, wherein the first portion and the second portion of the casing are identical and symmetrical with respect to each other about the interface plane.

5. The electrical fluid heater as claimed in claim 1, wherein the partition groove is centrally disposed with respect to the casing and separates the first pass "A" from the second pass "B".

6. The electrical fluid heater as claimed in claim 1, wherein the inlet and the outlet are formed by assembling complementary profiles and formed on the first portion and the second portion of the casing, respectively, that are received and held in sleeves and.

7. The electrical fluid heater as claimed in claim 1, wherein the inlet and the outlet are centrally disposed with respect to the respective the first and the second chambers and.

8. The electrical fluid heater as claimed in claim 1, wherein the intermediate connecting portion has a cross section that varies along a longitudinal direction of the heating element.

9. The electrical fluid heater as claimed in claim 1, wherein the intermediate connecting portion is formed by assembling sections and at either one of distal and proximal ends of the first portion and the second portion of the casing.

10. The electrical fluid heater as claimed in claim 1, wherein the intermediate connecting portion has a largest cross-section at a center of the casing and gradually decreases from the center to the respective lateral sides of the casing.

11. The electrical fluid heater as claimed in claim 1, further comprising turbulators disposed in an annular space between the heating element and the casing.

12. The electrical fluid heater as claimed in claim 1, wherein the casing further comprises an intermediate groove having a cross section with a curved profile, the intermediate groove extending along lateral side of the heating element and being disposed between heating elements received in the casing.

13. The electrical fluid heater as claimed in claim 12, wherein a radius of curvature "R" of the cross section of the curved profile of the intermediate groove is more than a radius of curvature "r" of the curved profile of the lateral sides of the tubular element.

* * * * *